(12) United States Patent
Kimpton et al.

(10) Patent No.: US 10,353,718 B2
(45) Date of Patent: Jul. 16, 2019

(54) PROVIDING ACCESS TO A REMOTE APPLICATION VIA A WEB CLIENT

(75) Inventors: Andrew Kimpton, Winchester, MA (US); Jonathan Clark, San Francisco, CA (US); Sarel Kobus Jooste, Novato, CA (US)

(73) Assignee: VMWARE, INC., Palo Alto, CA (US)

( * ) Notice: Subject to any disclaimer, the term of this patent is extended or adjusted under 35 U.S.C. 154(b) by 722 days.

(21) Appl. No.: 13/556,013

(22) Filed: Jul. 23, 2012

(65) Prior Publication Data
US 2014/0026057 A1 Jan. 23, 2014

(51) Int. Cl.
*G06F 9/451* (2018.01)

(52) U.S. Cl.
CPC ................................ *G06F 9/451* (2018.02)

(58) Field of Classification Search
CPC .............................. G06F 9/4443; G06F 3/1415
USPC .................................................. 715/733, 760
See application file for complete search history.

(56) References Cited

U.S. PATENT DOCUMENTS

| | | | |
|---|---|---|---|
| 6,226,657 B1 * | 5/2001 | Andersen | 715/234 |
| 6,874,086 B1 | 3/2005 | Gu et al. | |
| 8,453,148 B1 * | 5/2013 | Hobbs | G06F 3/1454 718/102 |
| 2002/0104022 A1 * | 8/2002 | Jorgenson | 713/201 |
| 2002/0165821 A1 * | 11/2002 | Tree | 705/39 |
| 2002/0198965 A1 * | 12/2002 | Kraft | 709/219 |
| 2003/0069968 A1 * | 4/2003 | O'Neil | H04L 67/1008 709/225 |
| 2004/0080504 A1 * | 4/2004 | Salesky et al. | 345/418 |
| 2005/0043998 A1 * | 2/2005 | Bross et al. | 705/19 |
| 2005/0080915 A1 * | 4/2005 | Shoemaker et al. | 709/231 |
| 2006/0230105 A1 * | 10/2006 | Shappir et al. | 709/203 |

(Continued)

FOREIGN PATENT DOCUMENTS

| | | |
|---|---|---|
| JP | 2004-348380 A | 12/2004 |
| JP | 2006-172193 A | 6/2006 |

(Continued)

OTHER PUBLICATIONS

International Search Report and Written Opinion dated Oct. 4, 2013, International Application No. PCT/US2013/045257, 8 pages.

(Continued)

*Primary Examiner* — Li P Sun
(74) *Attorney, Agent, or Firm* — Patterson & Sheridan, LLP

(57) ABSTRACT

Techniques for remote application access are described. Some embodiments provide access to an application executing on a host system via a Web browser of a client device. A user operating the Web browser may request access to the application via a uniform resource identifier. A service executing on the host system receives the request and facilitates access to the application. Facilitating access may include transmitting to the Web browser image data corresponding to a window or graphical user interface generated by the application and stored on the host system. Client logic executing within the Web browser receives the image data and displays a local copy of the application window on the client device. The client logic also forwards user input events made with respect to the to the local window to the remote presentation service, which in turn forwards the events to the window/application on the host system.

15 Claims, 8 Drawing Sheets

(56) References Cited

U.S. PATENT DOCUMENTS

| | | | |
|---|---|---|---|
| 2006/0265662 A1 | 11/2006 | Gertzen | |
| 2009/0282359 A1* | 11/2009 | Saul et al. | 715/784 |
| 2010/0077058 A1 | 3/2010 | Messer | |
| 2010/0111410 A1 | 5/2010 | Lu et al. | |
| 2011/0157169 A1* | 6/2011 | Bennett et al. | 345/419 |
| 2012/0054640 A1* | 3/2012 | Nancke-Krogh | 715/751 |
| 2012/0079374 A1* | 3/2012 | Gaddis | 715/269 |
| 2012/0166970 A1* | 6/2012 | Gastaldi | G06Q 10/10 715/753 |

FOREIGN PATENT DOCUMENTS

| | | |
|---|---|---|
| JP | 2009-140191 A | 6/2009 |
| JP | 2009-245301 A | 10/2009 |
| JP | 2010-256972 A | 11/2010 |
| JP | 2012-099132 A | 5/2012 |
| WO | 2011/123840 A2 | 10/2011 |

OTHER PUBLICATIONS

Kujira Hikoh Zukue, "HTML5, Introduction to smartphone apps developement—Essential techniques for Canvas screen compositions and smartphone apps-", Nikkei Software, vol. 15, No. 7, pp. 86-91, May 24, 2012, Nikkei Business Publications, Inc.

Japanese Office Action dated Mar. 8, 2016 in counterpart Japanese Patent Application No. 2015-520243.

EPC Communication pursuant to Article 94(3), Appln No. 13 731 588.3-1221, dated Feb. 21, 2018. pp. 1-5.

2nd EPC Communication pursuant to Article 94(3), Appln No. 13 731 588.3-1221, dated Oct. 2, 2018. pp. 1-8.

* cited by examiner

PROVIDING ACCESS TO A REMOTE APPLICATION VIA A WEB CLIENT

CROSS-REFERENCE TO RELATED APPLICATIONS

This Application is related by subject matter to U.S. patent application Ser. No. 13/449,076, filed on Apr. 17, 2012 and entitled "PRESENTING DYNAMICALLY CHANGING IMAGES IN A LIMITED RENDERING ENVIRONMENT," incorporated herein by reference in its entirety.

TECHNICAL FIELD

The present disclosure relates to methods, techniques, and systems for remote access to desktop applications and, more particularly, to methods, techniques, and systems for providing access via a Web client to an application executing on a remote computing system.

BACKGROUND

A variety of approaches to providing remote access to applications exist. In one approach, using X Windows, an application running on a first computing system can display a graphical window on a second computing system. Mouse-clicks, keystrokes, and other input events made by a user of the second computing system are forwarded to the first computing system. The application executing on the first computing system uses the display of the second computing system as its display—it does not display its window(s) on the first computing system.

The X Windows approach suffers from a number of drawbacks, including the requirement that the second computing system include a relatively complex and frequently difficult to configure piece of software, the X Server. In addition, initiating execution of a program is typically a multi-step, manual process. The user of the second computing system first manually logs on (e.g., via TELNET or SSH) to the first computing system, and configures the first computing system to use the second computing system as a display device. Then, the user configures the second computing system to allow the first computing system to use the second computing system as a display. Next, the user returns to the first computing system and executes the desired application, which then presents its window on the second computing system.

In another approach, VNC ("Virtual Network Computing"), a server executing on a first computing system transmits image data from the frame buffer of the first computing system to a second (client) computing system for display. VNC suffers from a number of drawbacks, including the requirement to install a special-purpose client application on the second computing system. In addition, VNC is limited to displaying the entire display of the first computing system, which is typically an entire operating system user interface (e.g., a desktop). VNC cannot distinguish between, or separately present or manage, different application windows. Furthermore, launching an application on the first computing system requires a multi-step manual process including: the user of the second computing system recalling the name or identifier of the first computing system, establishing a connection (e.g., a session) to the first computing system to display the desktop of the first computing system on the second computing system, and then manually initiating execution of the application via the displayed desktop of the first computing system.

DETAILED DESCRIPTION

Figure 1A:
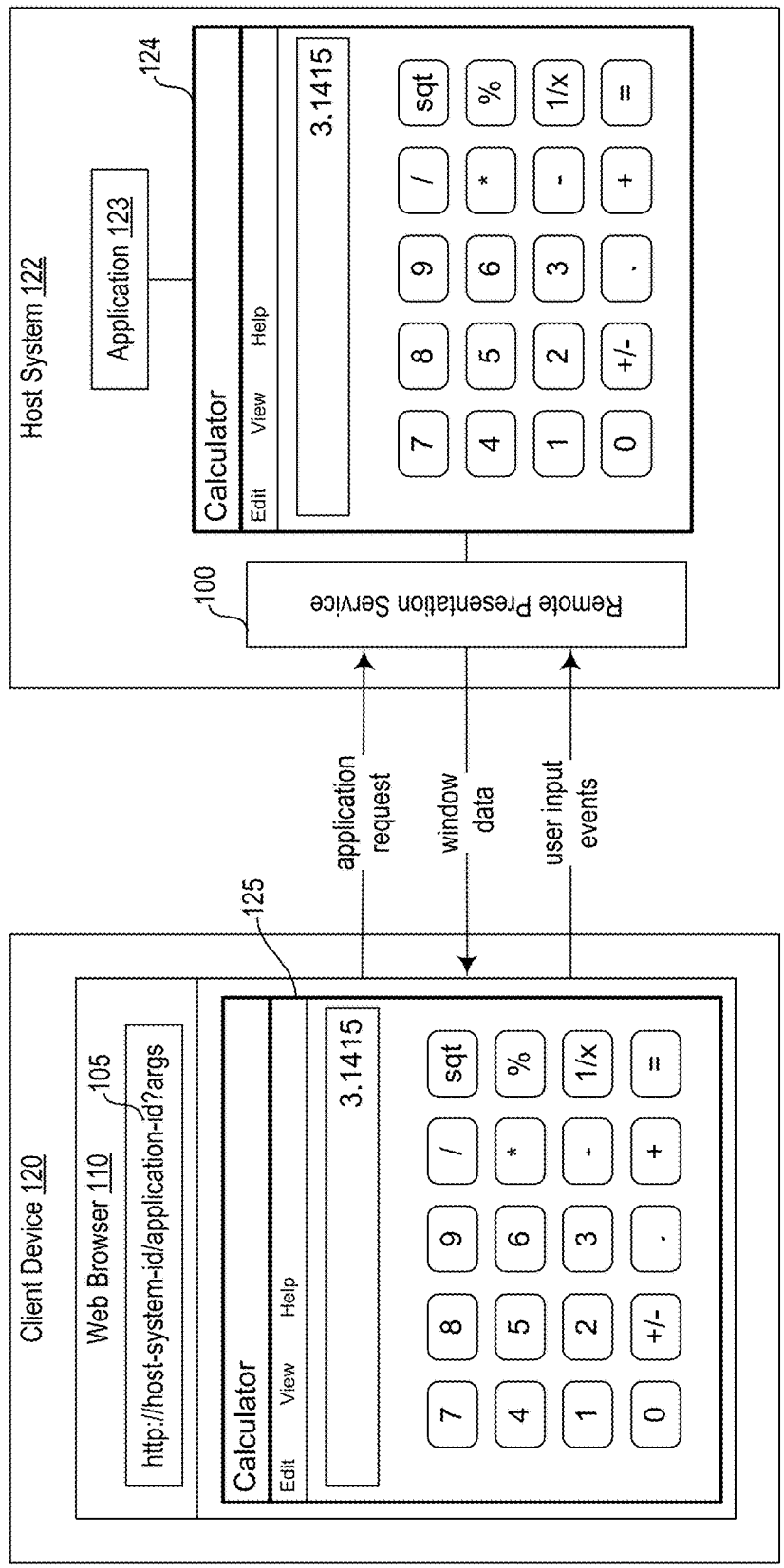
FIGS. 1A-1C are example block diagrams illustrating remote access to an application executing on a host computing system according to example embodiments.

Embodiments described herein provide enhanced computer- and network-based methods, techniques, and systems for remote access to desktop applications and, more particularly, for providing access via a Web client (e.g., a stand-alone Web browser, a Web-enabled component of a larger application, or the like) to an application executing on a remote computing system. Example embodiments provide a Remote Application Presentation System ("RAPS") that performs at least some of the described techniques. In some embodiments, the RAPS includes a server- or host-side component and a client-side component, respectively referred to herein as a remote presentation service and a remote presentation client.

The Remote Presentation Service ("RPS") executes on a host computing system and facilitates remote access to an application on the host computing system. Typically, the RPS provides access to an application on the host computing system via a uniform resource identifier ("URI") that identifies the application on the host computing system. Initially, the RPS receives from a remote Web client a request based on the URI to access the application. The request may be, for example, an HTTP request that includes data from the URI, including the identification of the application. Then, the RPS causes the remote Web client to display image data from or representing a window of the application in execution on the host computing system. For example, the RPS may transmit a copy of image data from the window to the remote Web client, where it is displayed on a corresponding display device. In addition, the RPS receives from the remote Web client indications of inputs made by the user with respect to the displayed image data of the application, which are then processed by the application executing on the host computing system.

Various types or forms of host computing system may be employed. In one embodiment, the host computing system may be a user's home or workplace personal computer (e.g., desktop system), and the user may remotely access applications installed thereon. In another embodiment, the host computing system may be a server system that is configured to host one or more applications for access by multiple distinct clients. Such an embodiment may facilitate (e.g., in a corporate setting) the sharing of a costly and/or limited-demand software application or suite amongst multiple users. In another embodiment, the host system is a virtual computing system (e.g., a virtual machine) that is managed by a virtual machine monitor, hypervisor, and/or other mechanism, possibly alongside multiple other virtual machines. Such an embodiment may facilitate the allocation and distribution of on-demand computing resources and applications to multiple distinct entities or organizations.

Note also that the described techniques facilitate remote access among heterogeneous systems and devices. In particular, a user may use a client device to interact with an application that does not natively (or otherwise) execute on the client device, such as because the application executable does not run on the client device (e.g., the operating system, machine architecture, and/or instruction set of the client device differs from that of the host system), the client device has insufficient resources (e.g., the client device does not have sufficient disk space to store the application or its data), or the like. In addition, there is typically no need to manually configure the client device, such as by installing special purpose software or authorizing the host system to utilize the client device as a display.

System Overview and Examples of Operation

Figure 1B:
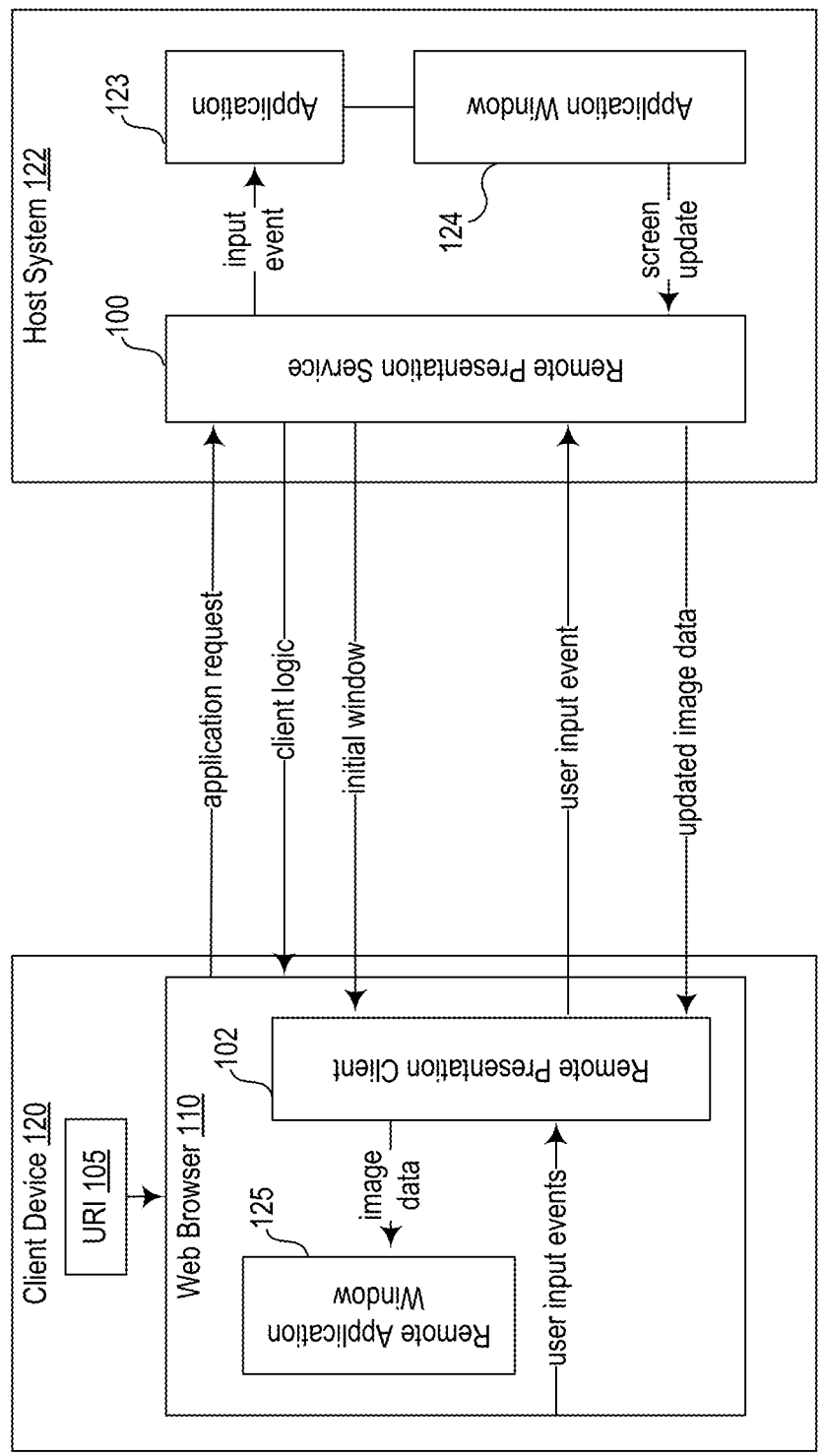
Figure 1C:
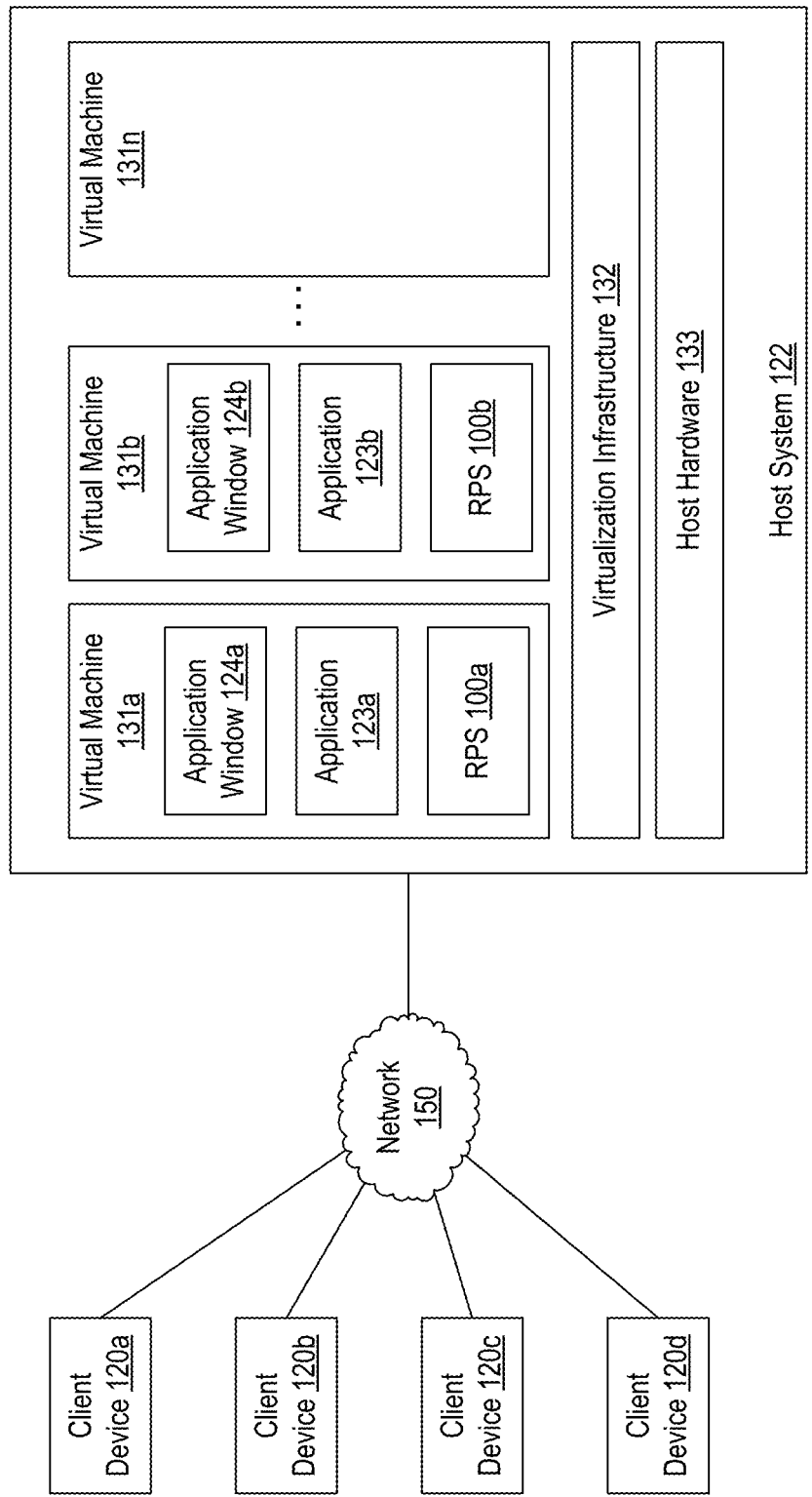

FIGS. 1A-1C are example block diagrams illustrating remote access to an application executing on a host computing system according to example embodiments. In particular, FIGS. 1A-1C illustrate remote access via a Web browser 110 executing on a client device 120 to an application 123 executing on a host computing system ("host system") 122. The host system 122 includes a remote presentation service ("RPS") 100. The host system 122 may be a desktop computer, a server system, a virtualized system, or the like.

A user operating the Web browser 110 on the client device 120 initiates access to the application 123 via a uniform resource identifier ("URI") 105. The URI 105 may be entered manually, such as via a text input field of the Web browser 110. In other examples, the URI may be accessed via some other user interface element/control, such as via a link, button, shortcut, bookmark, icon, or the like. In some embodiments, the general form of the URI 105 is http://host-system-id/application-id?args, where host-system-id identifies the host system 122, application-id identifies the application 123, and args identifies arguments/parameters for the application and/or the RPS 100. Based on the URI 105, the Web browser 110 forms and transmits to the RPS 100 on the host system 122 a request to access the application 123. The request may include one or more of an identifier of the host system 122, the application 123, as well as one or more arguments, parameters, or other data, all or some of which may be obtained from the URI 105.

In response to receiving the request to access the application 123, the RPS 100 facilitates access to the application 123. First, the RPS 100 may initiate execution of the application 123 if it is not already running. The application 123 generates an application window 124, which typically presents, provides, or otherwise represents a graphical user interface for the application 123. The window 124 need not necessarily be displayed by the host system 122. For example, the window 124 may be stored in a display buffer (e.g., a frame buffer, video memory) or other memory (e.g., system memory, persistent storage) of the host system 122. An example display buffer 407 is described with respect to FIG. 4, below. In some embodiments, the host system 122 does not include a local display device, such as when the host system 122 is part of a data center.

The RPS 100 obtains access to the application window 124, which may include both receiving notification of window updates and providing user input events and/or other inputs to/from the application 123 and/or the window 124. Window updates may be delivered to the RPS 100 due to a variety of conditions or events, including when image data displayed on the window 124 changes, when the window 124 is moved, resized, minimized, or the like. User input events may include keystrokes, pointer events (e.g., mouse clicks, moves, drags), audio inputs, and the like.

In response to window updates received from the application window 124, the RPS 100 transmits window image data to the Web browser 110, where it is displayed as a remote application window 125. The user of the Web browser 110 can then interact with (e.g., click on, type at) the remote application window 125. In response, the Web browser 110 forwards indications of the user input events to the RPS 100. In turn, the RPS 100 delivers the received user input events to the application 123, thereby causing the state of the application 123 to change. As the state of the application 123 changes, the window 124 is updated, resulting in a corresponding update to the remote application window 125.

Note that the window 125 may not be an identical copy of the window 124. As one example, image data transmitted by the RPS 100 may be lost in transit (e.g., due to dropped packets), resulting in a divergence between the windows 124 and 125. As another example, lossy compression techniques may be used to transmit image data, again resulting in differences between the windows 124 and 125. Also, scaling may be performed at the client device 120, such as when downscaling is performed to reduce the size of the window 125 to fit it onto a small display of a mobile device.

FIG. 1B describes the operation of a remote presentation client executing on the client device 120. In FIG. 1B, the Web browser 110 transmits an application request based on the URI 105 to the RPS 100. As noted, some embodiments use URIs having the form: http://host-system-id/application-id?args. Using URI terminology, the host system 122 is thus identified via the authority/host part of the URI (e.g., host-system-id), the application is identified by the path portion of the URI 105 (e.g., /application-id), and any arguments are specified via the query portion of the URI 105 (e.g., args). In particular, given an example URI of http://myhost.com/myapps/app.exe?file=file1.txt&dim=800×600, the host system 122 is identified as myhost.com, the application is identified as /myapps/app.exe, and the parameters/arguments are file=file1.txt (e.g., open the file file1.txt with the application) and dim=800×600 (e.g., set the window size to 800 by 600 pixels).

In some embodiments, the application 123 may be directly identified in the URI 105 using its file system location (e.g., /myapps/app.exe), whereas other embodiments may provide an additional level of indirection. In particular, some embodiments may use a key or other identifier that is looked up by the RPS 100 to determine the application to execute or access. In such an embodiment, an example of the URI 105 may be http://myhost.comnaunch?appid=12345&arg1=val1&arg2=val2&ws=closed. Note that in this example, the application 123 is identified as query parameter (e.g., appid=12345). Upon receipt, the RPS 100 will look up the identifier 12345 to determine the application to access.

In some embodiments, user identifiers may also be represented as part of the URI 105. In particular, where multiple users are sharing or accessing the host system 122, the URI 105 may include an identifier of a user and/or other user-specific data (e.g., user environment identifier, user desktop location, home directory). In such an embodiment, the general form of the URI 105 may be http://host-system-id/user-part/application-id?args, where user-part identifies the user and/or user-specific data. Other structures or representations are also contemplated, including providing user-specific information as part of the query portion of the URI 105. In other embodiments, the host-system-id part of the URI 105 may instead reference or otherwise identify a directory service that is configured to look up and dispatch (e.g., redirect) the request to a suitable host (e.g., a host having sufficient computing resources or a host having the requested application installed).

In response to the application request, the RPS 100 transmits client logic to the Web browser 110, wherein it is executed as a remote presentation client ("RPC") 102. The RPC 102 may implemented in JavaScript, as a Java Applet, as an ActiveX control, or using any other suitable technique for executing code within the context of the Web browser 110 or the client device 120 generally. In some embodiments, the RPC 102 may execute as part of (e.g., as a plug-in and/or within the same memory address space and/or application context) the Web browser 110 as shown here. In other embodiments, the RPC 102 may execute as a separate process independent of the Web browser 110, and communicate with the Web browser 110 using inter-process communication techniques (e.g., pipes, signals, messages). By transmitting client logic to the Web browser 110, a user of the Web browser 110 may access the application 123 without manually configuring or installing any client software on the client device 120.

Once the RPC 102 is active, the RPS 100 transmits image data representing the application window 124 for display as the remote application window 125. Typically, the RPS 100 will initially transmit an exact or substantial copy or representation of the entire application window 124 to the RPC 102 for display as the remote application window 125. In this manner, the RPC 102 initially presents a complete window to the user. Image data may be transmitted from the RPS 100 to the RPC 102 in a bitwise manner (e.g., bit-by-bit copies) or using one or more compression techniques, including lossless (e.g., entropy coding, run length coding) and/or lossy compression (e.g., color space reduction, transform coding, vector quantization). In some embodiments, the type and or quantity of compression may be based on one or more factors, such as available communication bandwidth, properties of a display device of the client device 120, or the like. The level of compression may also or instead be negotiated or varied in real time in response to changing conditions, such as the amount of available network bandwidth.

The RPC 102 is also responsible for transmitting information about user input events collected by the client device 120 with respect to the remote application window 125. Some embodiments provide a protocol, message set, class hierarchy, or the like, for representing or indicating user input events. For example, the RPC 102 may translate JavaScript-based events received from the Web browser 110 into another format (e.g., a system-independent or system-dependent format) for transmission to the RPS 100.

The RPS 100 is responsible for receiving and processing information about user input events received from the RPC 102. Processing events may include forwarding a user input event to the application 123 and/or the application window 124, such as by invoking an operating system function that generates and/or delivers an event to an identified process or window. Processing an event may also include translating, reformatting, or otherwise modifying user input events prior to forwarding them to the application window 124. For example, if the RPS 100 receives a user input event represented in a system-independent format, the RPS 100 may generate an event in a system-dependent format (e.g., a Windows event) tailored to the particular operating system executing on the host system 122. As another example, the RPS 100 may perform location translation operations, such as by translating mouse click coordinates from a coordinate system of the client device 120 (e.g., of the remote application window 125, Web browser, or desktop) to a coordinate system of the host system 122. In some cases, the RPS 100 may scale input events, such as when the remote application window 125 has been scaled down to fit on a small mobile device display.

The RPS 100 is further responsible for transmitting updated image data from the application window 124 to the RPC 102. In particular, in response to input events delivered to the application 123 and/or other input events or state changes, the application 123 causes the application window 124 to change over time. The RPS 100 identifies changes to the application window 124, such as by identifying changed or updated portions (e.g., blocks) of the application window 124. Given one or more updated window portions, the RPS 100 transmits to the RPC 102 image data representing those updated window portions. Typically, the transmitted image data will include location information so that the RPC 102 can determine which portions of the remote application window 125 to update.

The RPS 100 may transmit other data and/or messages to the RPC 102. For example, the RPS 100 may transmit process management information, such as a list of processes that are running or available via the host system 122. Similarly, the RPS 100 may respond to process control messages or commands received from the RPC 102, such as to process termination/suspension, window minimization/maximization, and the like. As another example, the RPS 100 may transmit event information related to the application 123 and/or the window 124, such as that a new window has been generated and/or opened, that a window has moved to a specified location, that a window has been resized, that a window has been closed, and the like.

FIG. 1C illustrates an embodiment operating in a virtualized environment. In FIG. 1C the host system 122 includes host hardware 133 having physical hardware, such as a processor, memory, persistent storage, network devices, display devices, and the like. The host system 122 also includes virtualization infrastructure 132 (e.g., a virtual machine monitor, a hypervisor) configured to provide a virtual operating platform for execution of multiple virtual machines 131a-131n.

In the illustrated example, virtual machines 131a and 131b respectively include an RPS 100 that facilitates remote access by one or more of the client devices 120a-120d. A single RPS 100 (e.g., RPS 100a) may facilitate access by multiple client devices to one or more applications. Note also that some virtual machines (e.g., virtual machine 131n) may not include an RPS 100 and may be executing applications or workloads that are not being accessed remotely. Furthermore, although the host system 122 is here shown as hosting multiple virtual machines 131a-131n (some of which include a remote presentation service), the host system 122 may instead be one of the virtual machines 131a-131n.

Figure 2A:
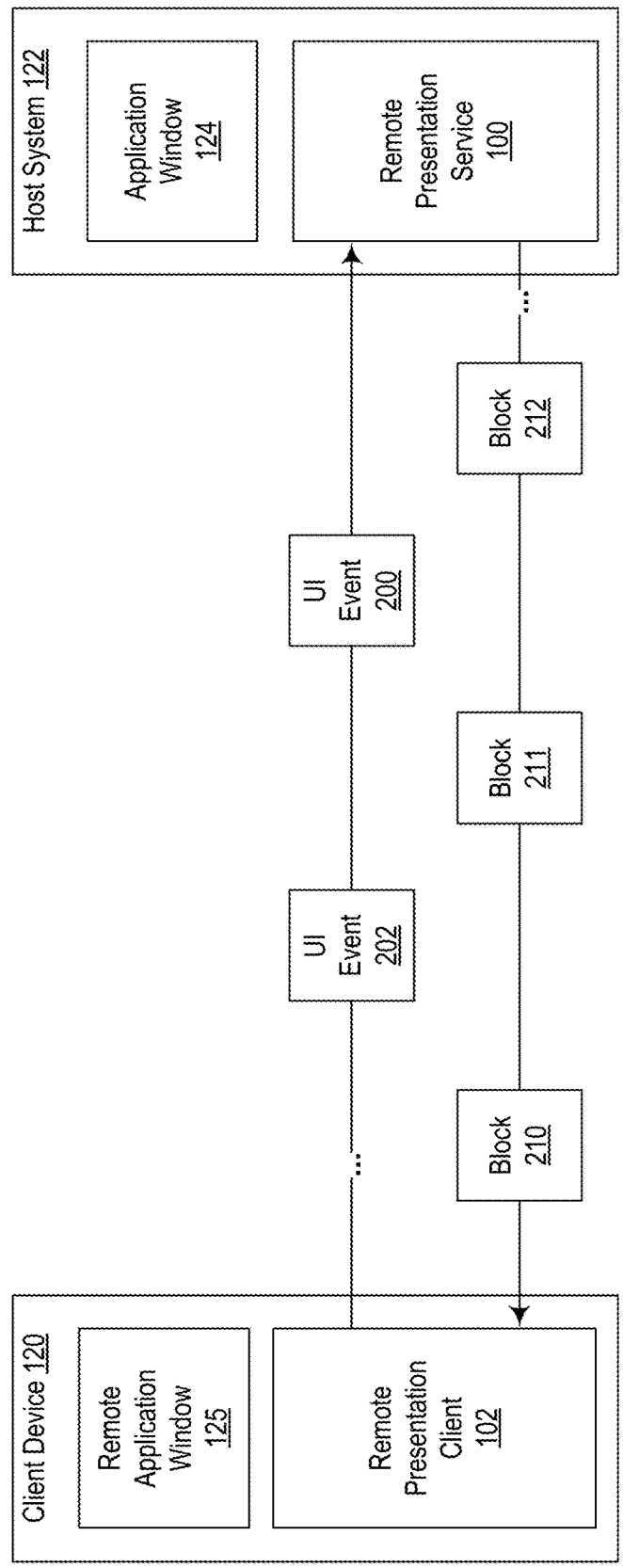
FIGS. 2A and 2B are example block diagrams illustrating the transmission and processing of image data and user interface events according to an example embodiment.
Figure 2B:
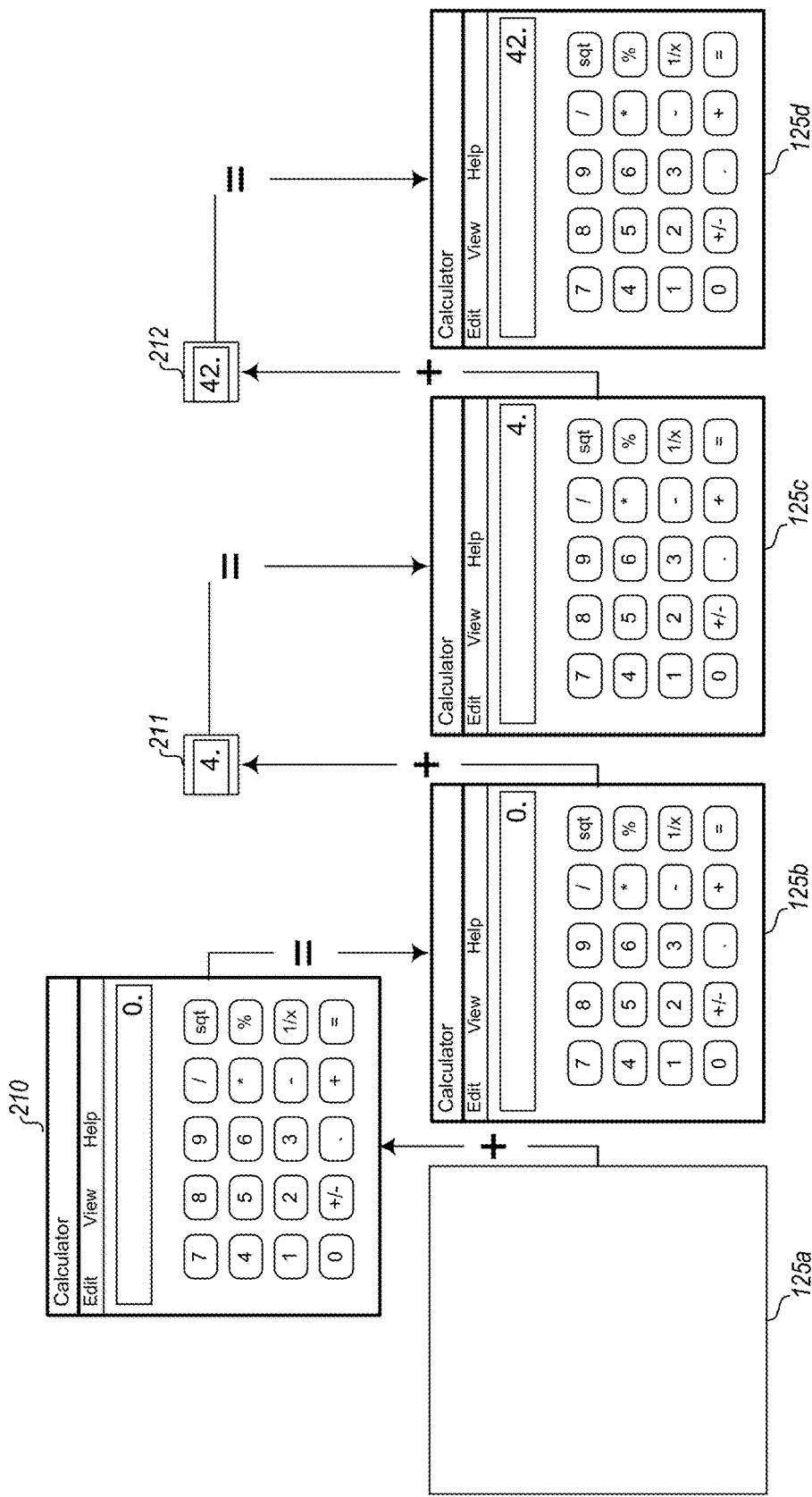

FIGS. 2A and 2B are example block diagrams illustrating the transmission and processing of image data and user interface events according to an example embodiment. In particular, FIG. 2A illustrates the flow of user input events and image blocks between the RPS 100 and the RPC 102. In FIG. 2A, the RPC 102 transmits a stream of user input events 200 and 202 to the RPS 100, where they are forwarded to the application window 124. In addition, the RPS 100 transmits a stream of image blocks 210-212 to the RPC 102, where they are presented on or as part of the remote application window 125. As noted above, other data and/or control messages may be transmitted between the RPS 100 and the RPC 102.

FIG. 2B illustrates an example of processing image blocks received by an example remote presentation client. More particularly, FIG. 2B shows how the remote application window 125 of a calculator application changes over time as the four image blocks 210-212 of FIG. 2A are received. The remote application window 125 is depicted at four points in time, illustrated by reference numerals 125a-125d.

Initially, the remote application window 125 is empty, as shown by remote application window 125a. Then, image block 210 is received. Image block 210 is a "key frame" or copy of the entire application window 124. Such key frames may be sent upon session initiation (e.g., when the application is started) and/or at other times, such as when an application window is maximized after having been placed in a minimized state. Image block 210 is incorporated (e.g., composited or "added") to the remote application window 125a, yielding remote application window 125b.

Next, image block 211 is received. Image block 211 corresponds to a change in the numerical display area resulting from the underlying calculator application processing the user input event 200, which may be a keystroke or mouse click entering the numeral 4. Image block 211 is then added to the remote application window 125b, yielding remote application window 125c. Remote application window 125c displays the numeral 4 (rather than a 0 as in window 125b) in its numerical display area.

Next, image block 212 is received. Image block 212 corresponds to a change in the numerical display area resulting from the calculator application processing user input event 202, which may be a keystroke or mouse click entering the numeral 2, causing the previously displayed numeral 4 to be updated to the numeral 42. Image block 212 is then added to the remote application window 125c, yielding remote application window 125d. Remote application window 125d displays the numeral 42 (rather than the 4 of window 125c).

The embodiment shown in FIG. 2B conserves network bandwidth by transmitting only those window portions that have been updated between two points in time. Note that in some embodiments, optimizations such as sending changed/updated image blocks may not be employed and, instead, key frames may be sent for each window update. In other examples, image blocks other than those illustrated (e.g., different sizes) may also be transmitted.

Table 1, below, includes a listing of HTML and JavaScript pseudo-code that could be used by a JavaScript-based implementation of a remote presentation client for execution on the client device 120.

TABLE 1

```
1   <html>
2   <body>
3
4   <canvas id="app" width="400" height="400"> </canvas>
5
6   <script type="text/javascript">
7
8   var appCanvas = document.getElementById('app');
9   var context = appCanvas.getContext('2d');
10  var remote_service;    // connection to Remote Presentation Service
11
```

TABLE 1-continued

```
12  function mouseEvtHandler(evt) {
13      // transmit information about mouse event to host
14      remote_service.transmit(evt);
15  }
16  function registerEventHandlers( ) {
18      appCanvas.addEventListener("mousedown", mouseEvtHandler,
        false);
19      appCanvas.addEventListener("mouseup", mouseEvtHandler,
        false);
20      appCanvas.addEventListener("mousemove", mouseEvtHandler,
        false);
21      // also add event listeners for keyboard events ...
22  }
23
24
25  function handleMessages( ) {
26      while (true) {
27          // receive image block
28          var msg = remote_service.receiveMessage( );
29          if (msg.isImageBlock( )) {
30              context.drawImage(msg.getImage( ), msg.getX( ),
                msg.getY( ));
31          }
32          else {
33              // handle other types of messages, including:
34              // child-window open/close
35              // window move or resize
36              // error messages
37          }
38      }
39  }
40
41  remote_service = ...;         // initialize remote service connection
42  registerEventHandlers( );     // register UI event handlers
43  handleMessages( );            // enter message loop
44
45  </script>
46  </body>
47  </html>
```

The listing of Table 1 defines and identifies an HTML CANVAS element (line 4). In addition, lines 6-45 define a SCRIPT element that includes JavaScript pseudo-code implementing at least a portion of an example remote presentation client 102. In some embodiments, the illustrated logic will be received from the remote presentation service in response to a URI-based request made by a Web browser 110 to the remote presentation service 100. In other embodiments, the illustrated logic may be pre-existing on the client device 120, such as in a cache or as pre-installed software.

Lines 12-22 illustrate an approach to processing user input events. In particular, an event handler (called "mouseEvtHandler") is defined (lines 12-15) and registered (lines 17-22). The event handler operates asynchronously to transmit received events to the remote presentation service 100.

Lines 25-39 illustrate an approach to processing messages received from the remote presentation service 100. In particular, a function named ("handleMessages") executes a message handling loop that repeatedly receives and processes messages from the remote presentation service 100. In lines 29-31, the function handles received image blocks by causing those blocks to be presented on a display device by drawing them to the CANVAS element. Other types of messages may be received and processed, as illustrated by lines 32-37.

While the approach described with respect to Table 1 utilizes the HTML CANVAS element, other embodiments may use different techniques. In particular, some embodiments support versions of HTML that do not provide a CANVAS element and/or otherwise have a limited rendering environment (e.g., no frame buffer). Such techniques are described in more detail in U.S. patent application Ser. No. 13/449,076 (Attorney Docket No. A667), filed on Apr. 17, 2012 and entitled "PRESENTING DYNAMICALLY CHANGING IMAGES IN A LIMITED RENDERING ENVIRONMENT."

While remote access via a Web browser is used to illustrate example embodiments, remote access may be provided via a different type of client in other embodiments. For example, remote access may be provided via a Web-enabled component embedded within another application or system, such as a mobile device/app, a desktop software suite, a kiosk system, or the like. Also, different Web or network protocols are contemplated, and the techniques are not limited only to the use of HTTP. In particular, other schemes may be supported and/or utilized, including HTTPS, FTP, or the like. Furthermore, a custom scheme and scheme name may be provided, such as REMOTEAPP (e.g., remoteapp://myhost.com/path/to/app?arg1=val1).

Also, different types of devices or systems may be used to implement or exercise the described techniques. For example, the client device 120 may be or include any computing device having sufficient processing power to execute the remote presentation client or similar logic, including a mobile device (e.g., smart phone), tablet system, kiosk system, embedded system (e.g., in a car), or the like. In addition, the host system 122 need not be a physical system, but rather may be a virtual machine hosted on physical hardware and managed by a hypervisor, virtual machine monitor, or similar mechanism.

Also, although certain terms are used primarily herein, other terms could be used interchangeably to yield equivalent embodiments and examples. For example, it is well-known that equivalent terms in the field of remote access or similar or related fields could be substituted for such terms as "host system," "client device," "Web client," or the like. Specifically, the term "host system" can be used interchangeably with "host," "host computer," "application home," "server," or the like. Likewise, the term "Web client" can be used interchangeably with the terms "HTTP client," "network client," "network access client," or the like. In addition, terms may have alternate spellings which may or may not be explicitly mentioned, and all such variations of terms are intended to be included.

Example embodiments described herein provide applications, tools, data structures and other support to implement a remote application presentation system to be used to provide remote application access via Web clients. Other embodiments of the described techniques may be used for other purposes, including for developing and providing "thin" network clients generally and/or implementing a zero-configuration application infrastructure. In the following description, numerous specific details are set forth, such as data formats and code sequences, and the like, in order to provide a thorough understanding of the described techniques. The embodiments described also can be practiced without some of the specific details described herein, or with other specific details, such as changes with respect to the ordering of the logic, different logic, or the like. Thus, the scope of the techniques and/or functions described are not limited by the particular order, selection, or decomposition of aspects described with reference to any particular routine, module, component, and the like.

Example Processes

Figure 3A:
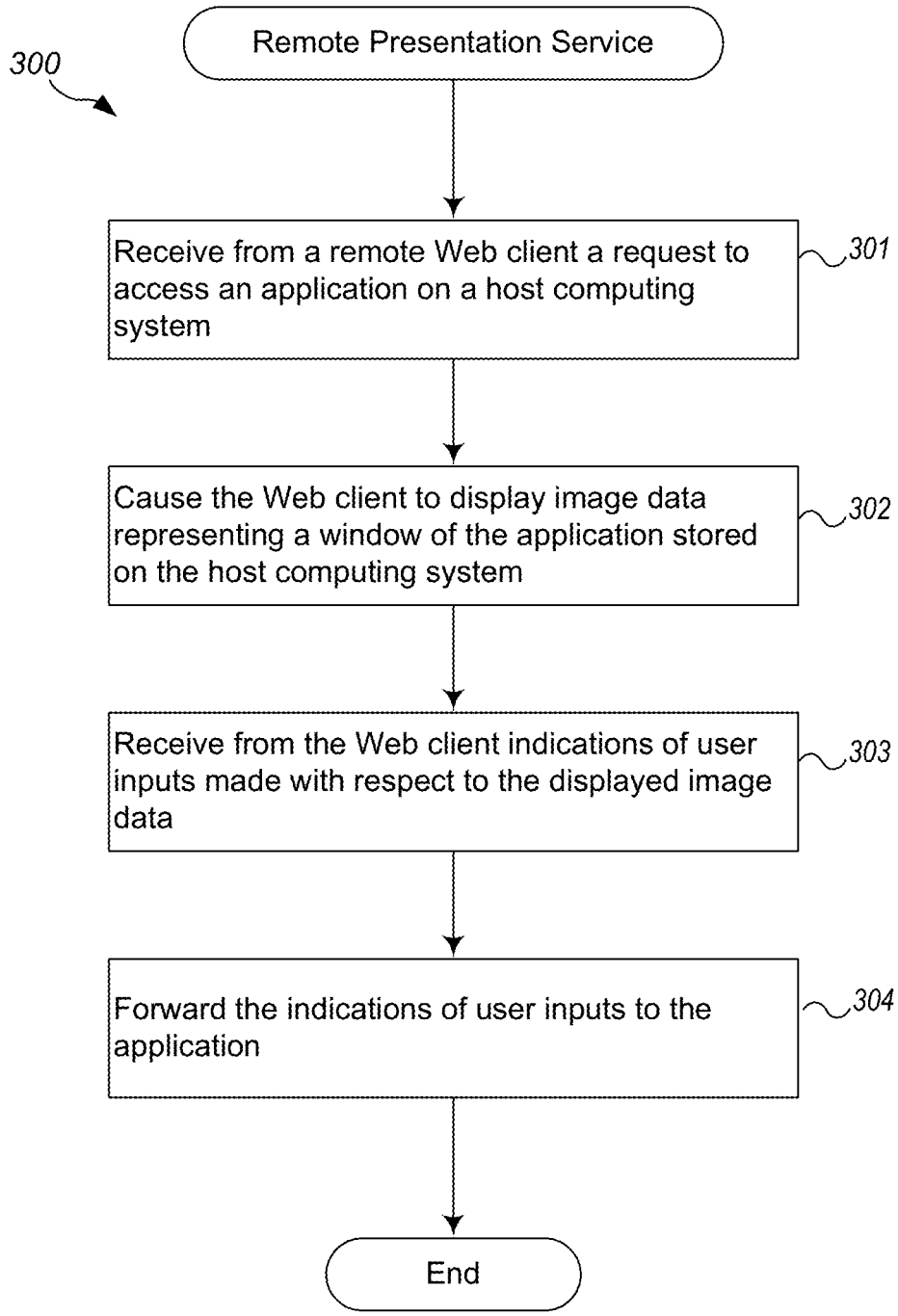
FIGS. 3A and 3B are example flow diagrams of remote access processes performed by example embodiments.
Figure 3B:
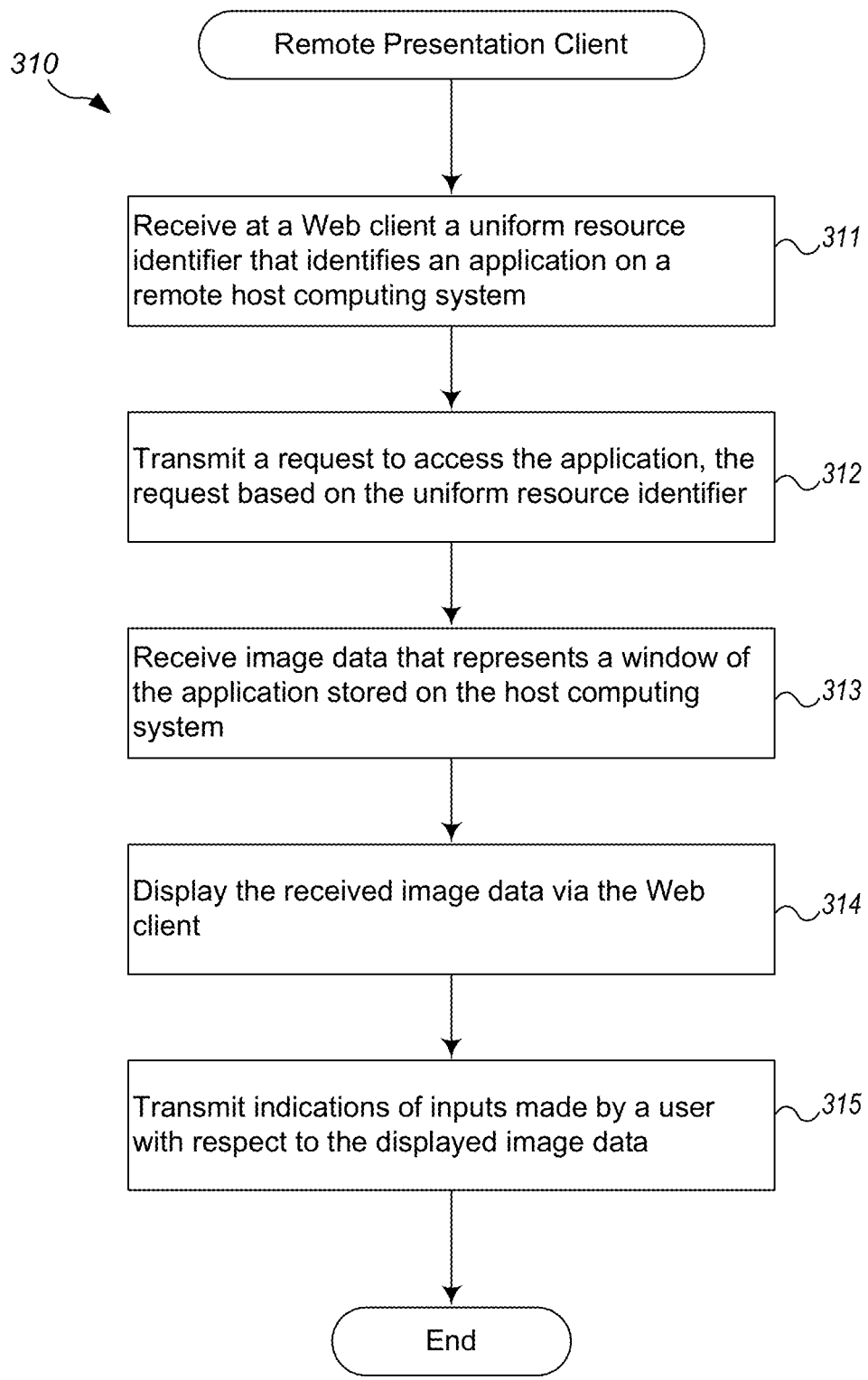

FIGS. 3A and 3B are example flow diagrams of remote access processes performed by example embodiments.

FIG. 3A is an example flow diagram of a remote presentation service process 300 performed by one embodiment. The illustrated process may be performed by, for example, the remote presentation service 100 executing on the host computing system 122 described above.

At block 301, the process 300 receives from a remote Web client a request to access an application on a host computing system. In some embodiments, the received request is an HTTP request that includes at least a portion of a URI that identifies (directly or indirectly) the host computing system and the application, such as the path (e.g., identifying the application) and any query arguments (e.g., name value pairs occurring after the "?" in the URI).

At block 302, the process 300 causes the Web client to display image data representing a window of the application stored on the host computing system. Causing the Web client to display the image data may include transmitting to the Web client (or some module executed thereby or therein) a representation of all or some of the window (or graphical user interface generally) stored on the host computing system. In this manner, the process 300 causes the Web client to display a window that is at least a substantial copy of the window on the host computing system. The process 300 may identify and transmit only those portions of the window that have been updated or changed since some prior point in time. When the image data is received at the remote Web client, it is displayed on a display device for viewing by a user. The transmitted image data may be compressed using lossless or lossy compression techniques. The window stored on the host computing system need not necessarily be displayed by the host computing system. For example, it may be stored in a memory (e.g., display buffer, system memory, disk) of the host computing system but not displayed (e.g., because the host computing system does not have a display device, because the display device of the host computing system is powered off).

As noted, in order to preserve bandwidth, the process 300 may determine and transmit only modified image blocks by performing a block-by-block comparison between a current image of the window and a previous image of the window (e.g., stored at the time of a previous window update event). Different block sizes and shapes are contemplated, including 8×8, 16×16, 8×16, and the like. In some embodiments, block size may be dynamically determined, based on factors such as network latency, the scope and amount of modification, and the like. For example, two neighboring square blocks may be transmitted as a single rectangular block in order to reduce the number of network transactions (e.g., TCP and/or HTTP connections and corresponding tear-downs).

At block 303, the process 300 receives from the Web client indications of user inputs made with respect to the displayed image data. As the user interacts with the window as displayed by the remote Web client, the Web client gathers user input events, indications of which are transmitted to this process. User input events may include pointer events (e.g., mouse, stylus, touch screen action), keyboard/keypad events, audio events, gesture-based events, or the like.

At block 304, the process 300 forwards the indications of user inputs to the application. Forwarding the indications of user inputs may include generating events that are provided (e.g., via an operating system call) to the application on the host computing system.

Typically, the process 300 repeatedly performs the operations of blocks 302, 303, and 304, so as to continually transmit updated image data to the remote Web client and continually forward user input events to the application on the host system.

The process 300 may perform additional operations. For example, process 300 may also transmit a code module that is configured to display via the Web client a copy of the window on the host computing system and to transmit to the host computing system the indications of inputs made by the user. The code module may be, for example, the remote presentation client 102, described above. The code module may perform a process such as that described with respect to FIG. 3B, below.

FIG. 3B is an example flow diagram of a remote presentation client process 310 performed by one embodiment. The illustrated process may be performed by, for example, the remote presentation client 102 executing on the client device 120 described above.

At block 311, the process 310 receives a uniform resource identifier that identifies an application on a remote host computing system. The URI may be received from various sources, such as by manual user input (e.g., entering/typing into a URI input area of the Web client), via a Web page that includes a link based on the URI, via a shortcut on a user's desktop, or the like. In some embodiments, the URI may be part of a "start" or "home" page that is provided by the remote presentation service 100. In other embodiments, a URI may be part of a desktop shortcut or other icon.

At block 312, the process 310 transmits a request to access the application, the request based on the uniform resource identifier. Transmitting the request may include forming an HTTP request that includes at least a portion of the URI, such as the path (e.g., identifying the application) and any query arguments (e.g., name value pairs occurring after the "?" in the URI).

At block 313, the process 310 receives image data that represents a window of the application stored on the host computing system. As discussed above, the process may receive image blocks or other representations of the window associated with the application. The window is at least stored (e.g., in a display buffer, in system memory, on disk) by or on the host computing system. The window may (but need not) be currently displayed by the host computing system (e.g., on a display device of the host computing system).

At block 314, the process 310 displays the image data via the Web client. As shown in Table 1, the received image data (e.g., image blocks) may be displayed via an HTML CANVAS tag, thereby displaying a copy (or substantial copy) of the window or graphical user interface stored on the host computing system. In other embodiments, different drawing mechanisms may be utilized. For example, the process 310 may display received image data by embedding image blocks within DIV elements that are layered and presented by specifying corresponding z-coordinate levels.

At block 315, the process 310 transmits indications of inputs made by a user with respect to the displayed image data. As shown in Table 1, the process 310 may register event handlers that are called or otherwise notified when a user makes an input event with respect to the displayed image data. The process 310 then transmits these user input events (or some representation thereof) to the remote host system. Prior to transmission, the process 310 may translate the received event into a device-independent format prior to transmitting them to the host computing system.

Typically, the process 310 repeatedly performs the operations of blocks 313, 314, and 315, so as to continually update a locally displayed window on a client device with image data received from the host system and continually forward user input events to the remote presentation service on the host system.

The process 310 may perform additional operations. For example, process 310 may also receive events, messages, or commands from the remote presentation service, such as that a new window has been spawned or that window has closed, resized, or the like.

Example Computing System Implementation

Figure 4:
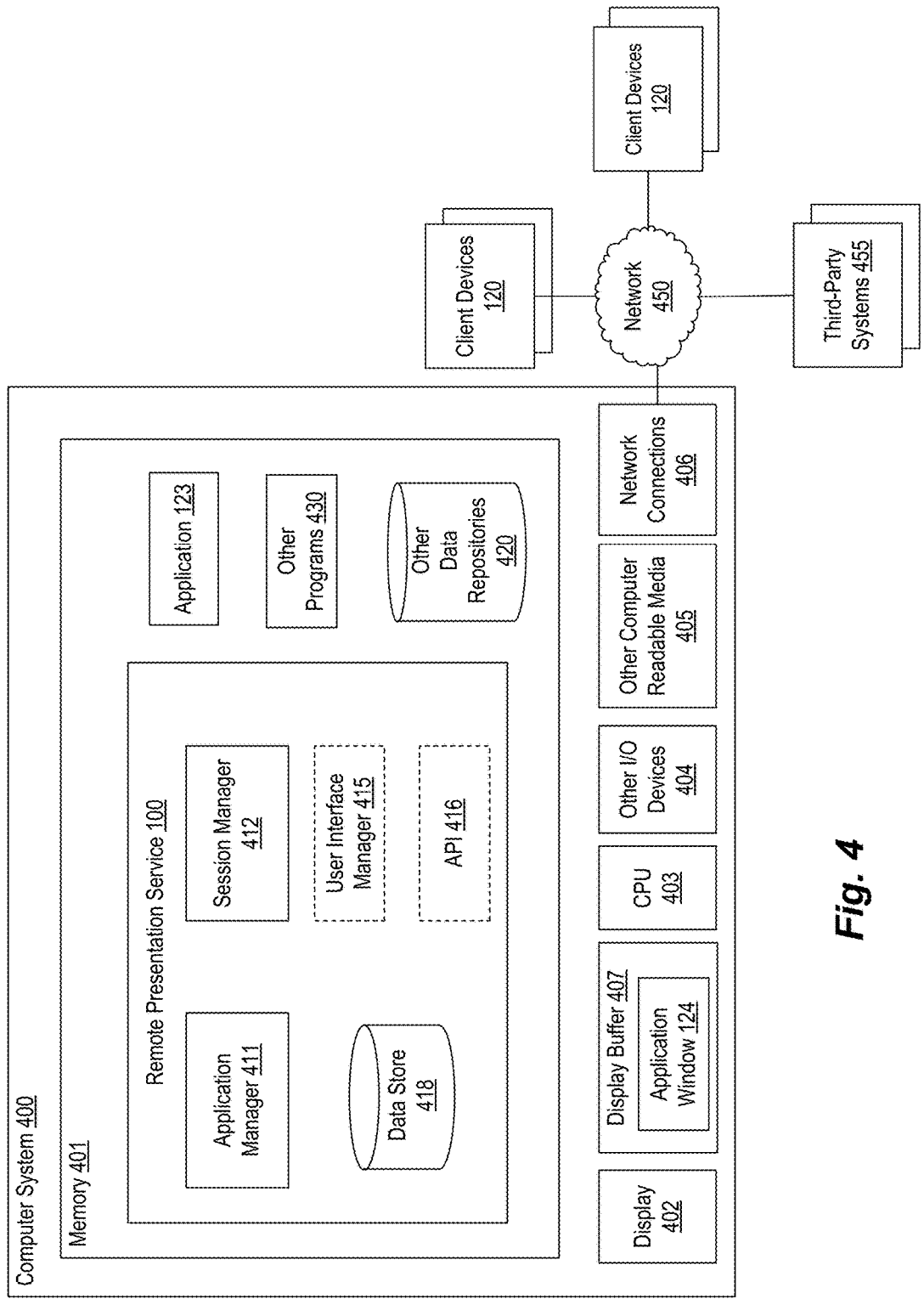
FIG. 4 is an example block diagram of an example computing system for implementing components of a remote application presentation system according to an example embodiment.

FIG. 4 is an example block diagram of an example computing system for implementing components of a remote application presentation system according to an example embodiment. In particular, FIG. 4 shows a computing system 400 that may be utilized to implement an RPS 100. The techniques described with respect to FIG. 4 may also or instead be applied to implement an RPC 102.

Note that one or more general purpose or special purpose computing systems/devices suitably instructed may be used to implement the RPS 100. In addition, the computing system 400 may comprise one or more distinct computing systems/devices and may span distributed locations. Furthermore, each block shown may represent one or more such blocks as appropriate to a specific embodiment or may be combined with other blocks. Also, the RPS 100 may be implemented in software, hardware, firmware, or in some combination to achieve the capabilities described herein.

In the embodiment shown, computing system 400 comprises a computer memory ("memory") 401, a display 402, one or more Central Processing Units ("CPU") 403, Input/Output devices 404 (e.g., keyboard, mouse, CRT or LCD display, and the like), other computer-readable media 405, network connections 406, and a display buffer 407. The RPS 100 is shown residing in memory 401. In other embodiments, some portion of the contents, some or all of the components of the RPS 100 may be stored on and/or transmitted over the other computer-readable media 405. The components of the RPS 100 preferably execute on one or more CPUs 403 and implement techniques described herein. Other code or programs 430 (e.g., an administrative interface, a Web server, and the like) and potentially other data repositories, such as data repository 420, also reside in the memory 401, and preferably execute on one or more CPUs 403. Of note, one or more of the components in FIG. 4 may not be present in any specific implementation. For example, some embodiments may not provide other computer readable media 405 or a display 402.

The RPS 100 interacts via the network 450 with client devices 120 and third-party systems/applications 455. The network 450 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX) that facilitate communication between remotely situated humans and/or devices. The third-party systems/applications 455 may include any systems that provide data to, or utilize data from, the RPS 100, including remote management/monitoring consoles, applications having embedded Web-client components, or the like.

The RPS 100 is shown executing in the memory 401 of the computing system 400. As discussed, the RPS 100 facilitates remote access to an application 123, also shown here in the memory 401. The application 123 has a corresponding window 124 that represents or is otherwise part of a graphical user interface of the application 123.

The application window 124 of the application 123 is shown here stored in the display buffer 407. The display buffer 407 may be or include a hardware frame buffer, video memory, or other memory buffer used to store one or more frames of image data (e.g., pixels) for display on the display 402. Applications (such as application 123) may access the display buffer 407 by invoking graphics library functions that modify the contents of the display buffer 407. Display drivers and/or other system modules periodically cause the contents of the display buffer 407 to be forwarded to the display 402. Note that some embodiments may provide a virtualized display buffer 407 that emulates a hardware frame buffer or similar device by, for example, using a combination of software and system memory 401. Note also that some embodiments do not include a display 402 or necessarily use the display 402 to present the application window 124.

In an example embodiment, the RPS 100 includes an application manager 411, a session manager 412, a user interface manager 415, an application program interface ("API") 416, and a data store 418. The user interface manager 415 and the API 416 are drawn in dashed lines to indicate that in other embodiments, functions performed by one or more of these components may be performed externally to the RPS 100.

The application manager 411 is responsible for tracking information about applications available via the RPS 100. For example, the application manager 411 may store information about or corresponding to application identifiers (e.g., names, file system locations, process identifiers), whether the applications are running or not, application window information (e.g., handle, location, dimensions), and the like. The application manager 411 may also provide an interface for executing and communicating with an application, such as by forwarding a user input event to the application, providing indications of window updates, and the like. In other embodiments, such an interface may also or instead be provided via the API 416, discussed below.

The session manager 412 is responsible for handling one or more sessions between a remote client device 120 and a corresponding application. Handling a session may include initiating the session by transmitting client logic (e.g., the remote presentation client 102) to the client device 120. Handling a session may also include receiving indications of user input events from the client device 120 and forwarding those input events to the appropriate application.

Handling a session may further include receiving an indication that the application window 124 has been updated. In response, the session manager 412 may determine which portions of the application window 124 have changed (e.g., since a previous update was received), and then transmit copies or other representations (e.g., compressed data) of those changed portions to the client device 120.

The UI manager 415 provides a view and a controller that facilitate user interaction with the RPS 100 and its various components. For example, the UI manager 415 may provide interactive access to the RPS 100, such that users can configure the operation of the RPS 100, such as by providing the RPS 100 with information about user preferences (e.g., client device settings, display preferences, compression levels), user credentials (e.g., passwords), or the like. In some embodiments, access to the functionality of the UI manager 415 may be provided via a Web server, possibly executing as one of the other programs 430. In such embodiments, a user operating a Web browser executing on one of the third-party systems 455 can interact with the RPS 100 via the UI manager 415.

The API 416 provides programmatic access to one or more functions of the RPS 100. For example, the API 416 may provide a programmatic interface to one or more functions of the RPS 100 that may be invoked by one of the other programs 430 or some other module. For example, the API 416 may provide access to functions for controlling an application (e.g., launching, terminating), passing events to the application, receiving events from the application, obtaining updated screen data, and the like. In this manner, the API 416 facilitates the development of third-party software, such as user interfaces, plug-ins, adapters (e.g., for integrating functions of the RPS 100 into mobile applications), and the like.

In addition, the API 416 may be in at least some embodiments invoked or otherwise accessed via remote entities, such as code executing on one of the client devices 120 and/or the third-party systems/applications 455, to access various functions of the RPS 100. For example, the client device 120 may initiate execution of the application 123 via the API, obtain a list of executing processes via the API 416, or the like. As another example, a monitoring console operating on the third-party system 455 may receive performance statistics via the API 416. The API 416 may also be configured to provide modules or widgets that can be integrated into the third-party applications 455 and that are configured to interact with the RPS 100 to make at least some of the described functionality available within the context of other applications (e.g., mobile apps).

The data store 418 is used by the other modules of the RPS 100 to store and/or communicate information. The components of the RPS 100 use the data store 418 to record and/or communicate various types of information, including application information (e.g., names, process identifiers, handles, window identifiers, window status), session information (e.g., user identifiers, active application identifiers, event queues, window data), and the like. Although the components of the RPS 100 are described as communicating primarily through the data store 418, other communication mechanisms are contemplated, including message passing, function calls, pipes, sockets, shared memory, and the like.

The architecture shown in FIG. 4 may in some embodiments be partially or fully virtualized. For example, the computer system 400 may be one or possibly many virtual machines executing on physical hardware and managed by a hypervisor, virtual machine monitor, or similar technology. In such an embodiment, remote application access may be provided using a service-based model, where a user may dynamically obtain access to an application and the corresponding computing resources used to run the application. Access to the application may be obtained in exchange for money, such as based on an application license rental or subscription model.

In an example embodiment, components/modules of the RPS 100 are implemented using standard programming techniques. For example, the RPS 100 may be implemented as a "native" executable running on the CPU 403, along with one or more static or dynamic libraries. In other embodiments, the RPS 100 may be implemented as instructions processed by a virtual machine that executes as one of the other programs 430. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The embodiments described above may also use either well-known or proprietary synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

In addition, programming interfaces to the data stored as part of the RPS 100, such as in the data store 420 (or 240), can be available by standard mechanisms such as through C, C++, C#, and Java APIs; libraries for accessing files, databases, or other data repositories; through scripting languages such as XML; or through Web servers, FTP servers, or other types of servers providing access to stored data. The data store 420 may be implemented as one or more database systems, file systems, or any other technique for storing such information, or any combination of the above, including implementations using distributed computing techniques.

Different configurations and locations of programs and data are contemplated for use with techniques of described herein. A variety of distributed computing techniques are appropriate for implementing the components of the illustrated embodiments in a distributed manner including but not limited to TCP/IP sockets, WebSockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in some embodiments, some or all of the components of the RPS 100 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the components and/or data structures may be stored on tangible, non-transitory storage mediums. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

All of the above U.S. patents, U.S. patent application publications, U.S. patent applications, foreign patents, foreign patent applications, non-patent publications, and appendixes referred to in this specification and/or listed in the Application Data Sheet, including but not limited to U.S. patent application Ser. No. 13/449,076 , filed on Apr. 17, 2012 and entitled "PRESENTING DYNAMICALLY CHANGING IMAGES IN A LIMITED RENDERING ENVIRONMENT," are incorporated herein by reference in their entireties.

From the foregoing it will be appreciated that, although specific embodiments have been described herein for purposes of illustration, various modifications may be made without deviating from the spirit and scope of this disclosure. For example, the methods, techniques, and systems for remote application access are applicable to other architectures or in other settings. For example, the described techniques may be employed as part of a cloud-based application offering, wherein customers may purchase access to applications on a subscription basis and that access may be provided and scaled in a dynamic manner, possibly based on virtualized infrastructure. Also, the methods, techniques, and systems discussed herein are applicable to differing protocols, communication media (optical, wireless, cable, etc.) and devices (e.g., desktop computers, wireless handsets, electronic organizers, personal digital assistants, tablet computers, portable email machines, game machines, pagers, navigation devices, etc.).

The invention claimed is:

1. A method in a host computing system for providing access via a remote Web client to applications on the host computing system, the Web client executing on a client device having a display device, the method comprising:
   providing a uniform resource identifier that identifies an application executing on the host computing system, the host computing system including a display buffer for storing an output graphical user interface generated by the application;
   receiving a request to access the application, the request received from the remote Web client and including the uniform resource identifier; and
   in response to receiving the request to access the application, executing the application on the host computing system, storing an output graphical user interface (GUI) generated upon execution of the application in the display buffer, and transmitting the output GUI stored in the display buffer to the remote Web client;
   receiving from the remote Web client inputs made with respect to the GUI transmitted to the remote Web client; and
   in response to receiving the inputs, delivering the inputs to the application, updating the output GUI stored in the display buffer as a state of the application changes in response to the inputs, and transmitting to the remote Web client update data that reflects changes in the output GUI stored in the display buffer.

2. The method of claim 1, wherein the receiving from the remote Web client inputs includes: receiving an indication of a mouse event and a corresponding location from the remote Web client.

3. The method of claim 2, further comprising: translating the location of the mouse event into a coordinate system of the host computing system.

4. The method of claim 1, further comprising: tracking information about multiple applications executing on the host computing system, the tracked information including application identifiers, application window positions, application window sizes, and/or application events.

5. The method of claim 1, wherein receiving a request to access the application includes receiving a hypertext transfer protocol (HTTP) request that identifies the application along with one or more arguments.

6. A system for providing access via a Web client to remote applications, the system comprising:
- a host computing system including a processor, a memory, a display buffer, an application, a first window stored in the display buffer, and a remote presentation service module stored in the memory and configured, when executed by the processor, to:
  - receive a request to access the application, the request received from a remote Web client executing on a client computing device having a display device, the request including a uniform resource identifier that identifies the application; and
  - in response to receiving the request to access the application, executing the application on the host computing system, storing an output graphical user interface (GUI) generated upon execution of the application in the display buffer, and transmitting the output GUI stored in the display buffer to the remote Web client;
  - and
  - receiving from the remote Web client inputs made with respect to the GUI transmitted to the remote Web client; and
  - in response to receiving the inputs, delivering the inputs to the application, updating the output GUI stored in the display buffer as a state of the application changes in response to the inputs, and transmitting to the remote Web client update data that reflects changes in the output GUI stored in the display buffer.

7. The system of claim 6, wherein receiving a request to access the application includes receiving a hypertext transfer protocol (HTTP) request that identifies the application along with one or more arguments.

8. The system of claim 6, wherein receiving from the remote Web client inputs includes receiving an indication of a mouse event and a corresponding location from the remote Web client.

9. The system of claim 8, further comprising translating the location of the mouse event into a coordinate system of the host computing system.

10. The system of claim 6, further comprising tracking information about multiple applications executing on the host computing system, the tracked information including application identifiers, application window positions, application window sizes, and/or application events.

11. A non-transitory computer-readable medium including contents that are configured, when executed, to cause a host computing system to perform a method for providing access via a remote Web client to applications on the host computing system, the Web client executing on a client device having a display device, the method comprising:
- receiving a request to access an application executing on the host computing system, the application having a first window for display on a local display device of the host computing system, the request received from the remote Web client and including a uniform resource identifier that identifies the host computing system and the application; and
  - in response to receiving the request to access the application, executing the application on the host computing system, storing an output graphical user interface (GUI) generated upon execution of the application in the display buffer, and transmitting the output GUI stored in the display buffer to the remote Web client;
  - receiving from the remote Web client inputs made with respect to the GUI transmitted to the remote Web client; and
  - in response to receiving the inputs, delivering the inputs to the application, updating the output GUI stored in the display buffer as a state of the application changes in response to the inputs, and transmitting to the remote Web client update data that reflects changes in the output GUI stored in the display buffer.

12. The computer readable medium of claim 11, wherein receiving a request to access the application includes receiving a hypertext transfer protocol (HTTP) request that identifies the application along with one or more arguments.

13. The computer readable medium of claim 11, wherein receiving from the remote Web client inputs includes receiving an indication of a mouse event and a corresponding location from the remote Web client.

14. The computer readable medium of claim 13, further comprising translating the location of the mouse event into a coordinate system of the host computing system.

15. The computer readable medium of claim 11, further comprising tracking information about multiple applications executing on the host computing system, the tracked information including application identifiers, application window positions, application window sizes, and/or application events.

* * * * *